April 17, 1956     F. WOHLFAHRT     2,741,936
METHOD OF FORMING HOLES IN METAL
Filed March 10, 1951     5 Sheets-Sheet 1
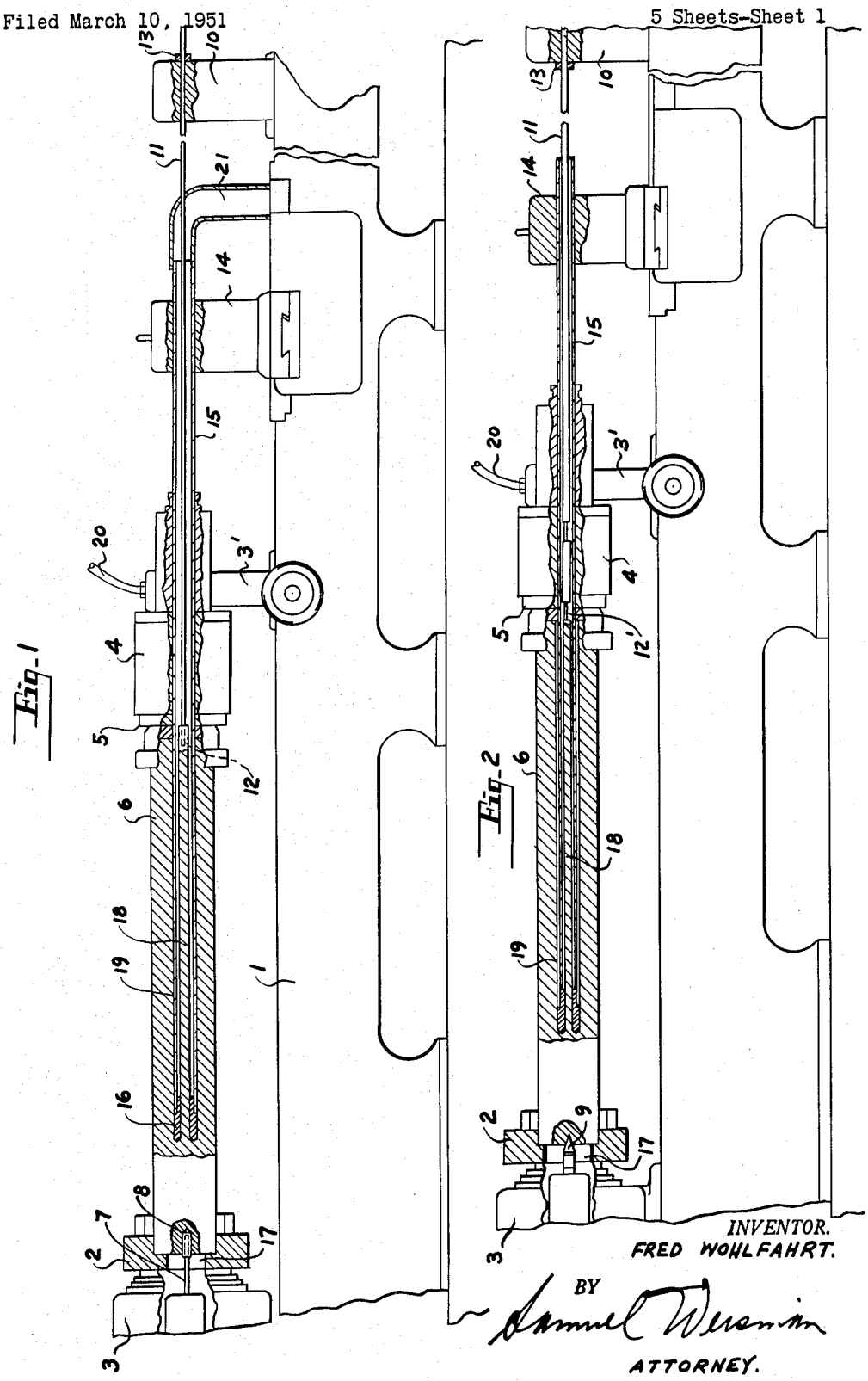
INVENTOR.
FRED WOHLFAHRT.
BY
ATTORNEY.

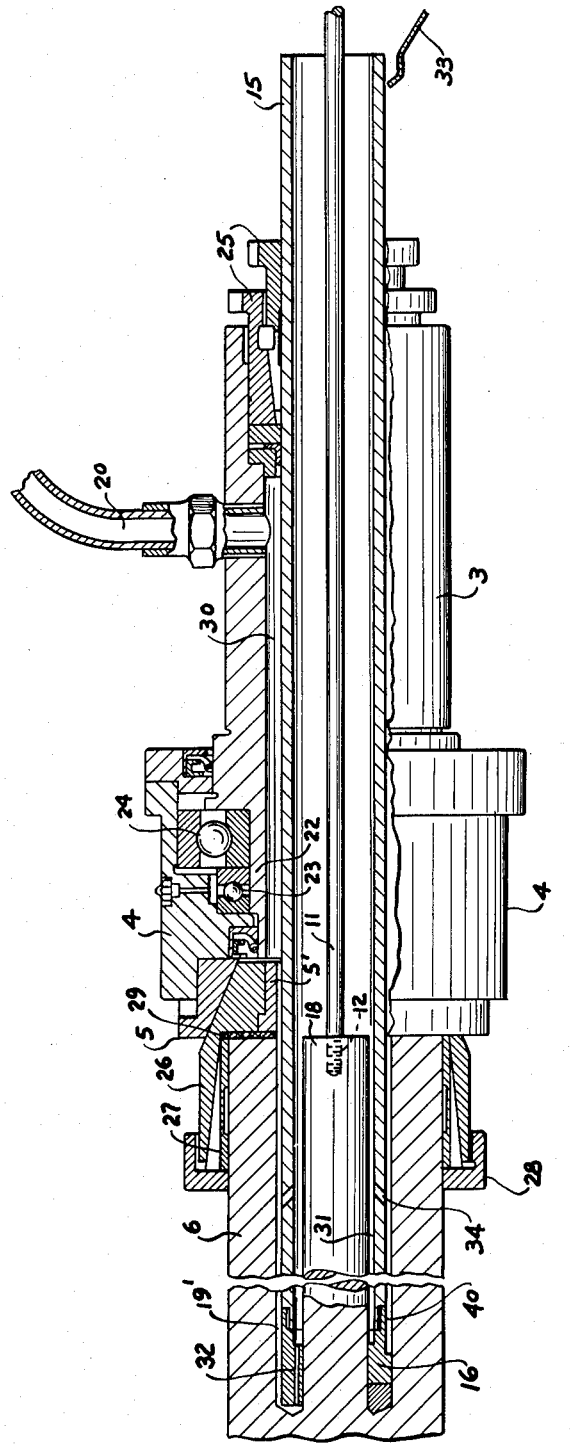

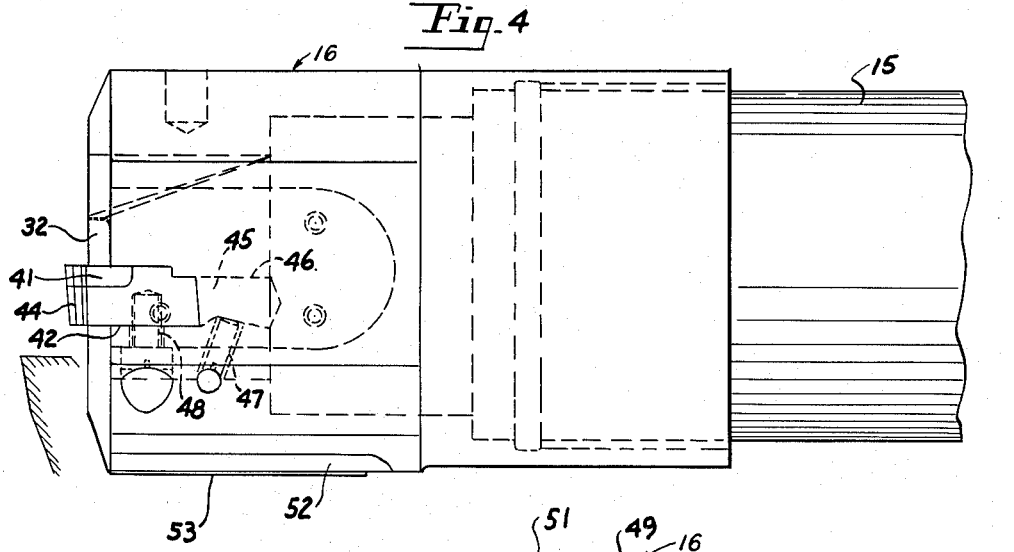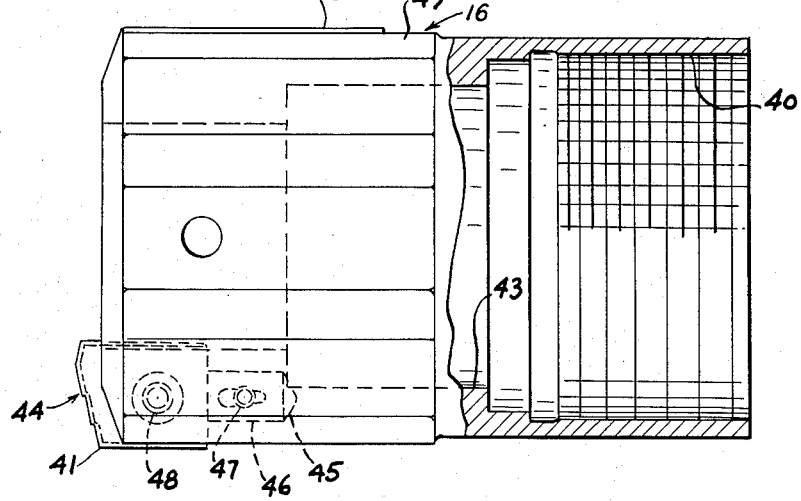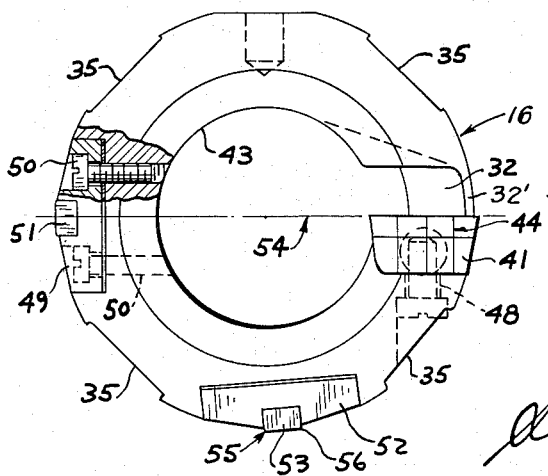

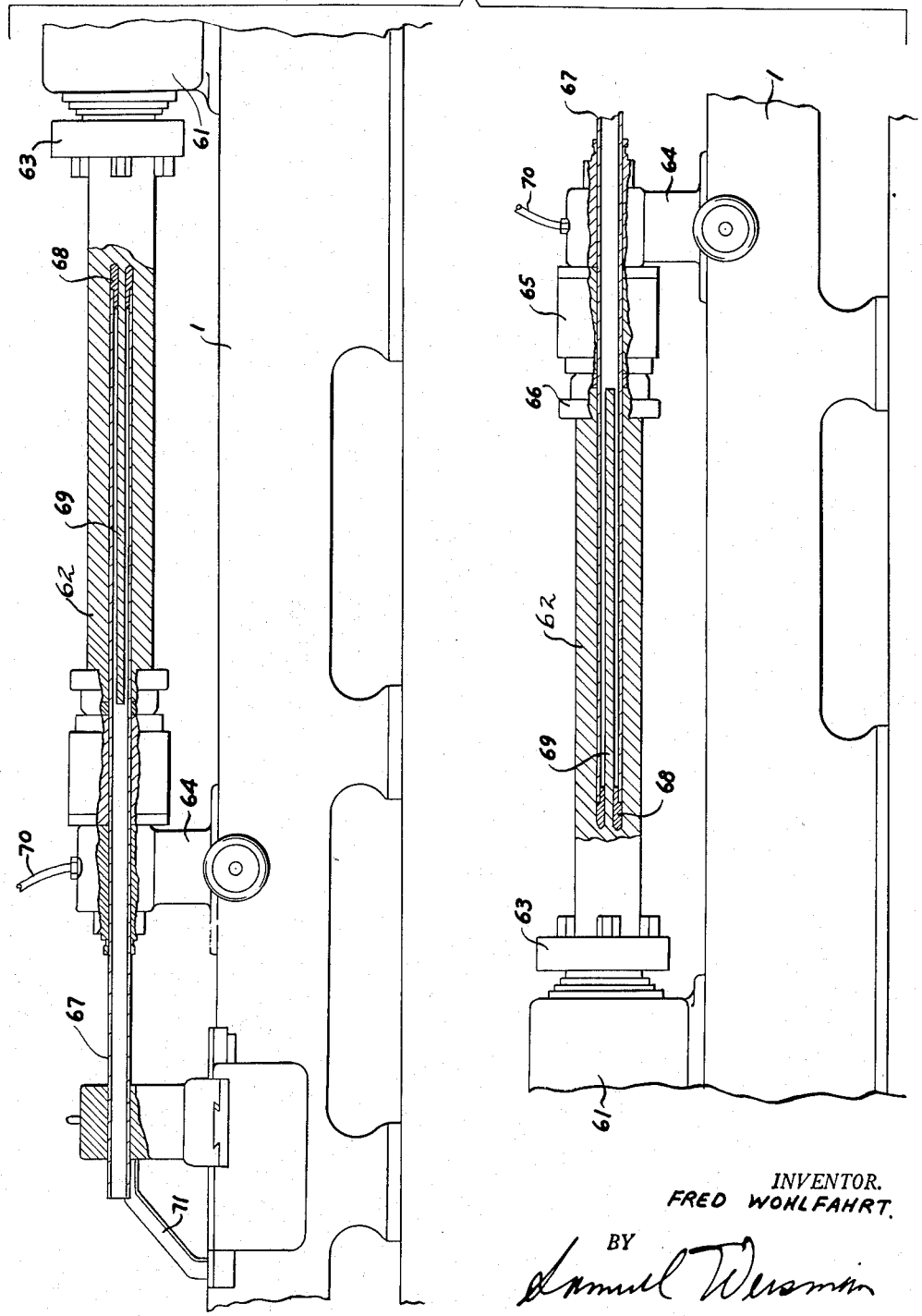

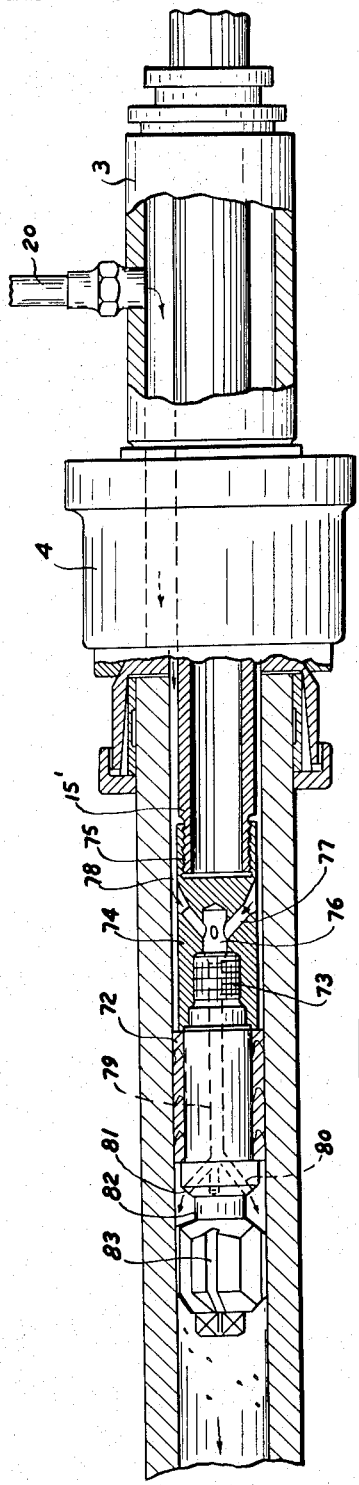
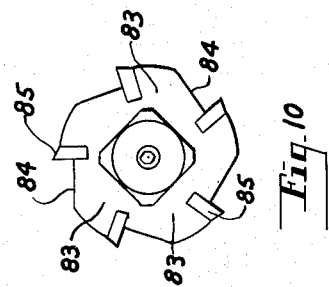
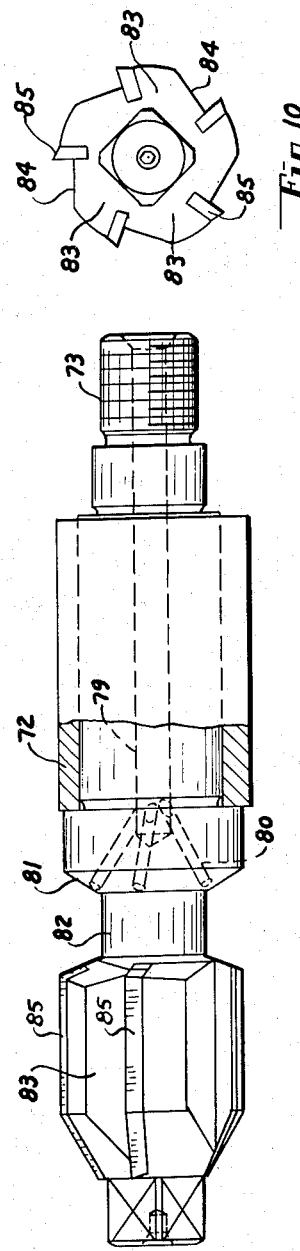
INVENTOR.
FRED WOHLFAHRT.

United States Patent Office 2,741,936
Patented Apr. 17, 1956

2,741,936

METHOD OF FORMING HOLES IN METAL

Fred Wohlfahrt, Centerline, Mich.

Application March 10, 1951, Serial No. 214,912

6 Claims. (Cl. 77—3)

The present invention pertains to a novel method of forming holes in metal by various methods such as trepanning, rough and finished boring, and shaving, especially in deep hole operations.

In the methods heretofore employed, one of the difficulties is complete removal of chips and scoring of the bore by the chips. Also, interference from chips often results in deviation or run-off of the tool from center, requiring either discarding of the work piece or an expensive correction.

Another characteristic of present methods is that the tool is not driven quite to the far end of the work piece, since no means has yet been provided to permit the tool to cut clear through this end. Consequently, the work piece must be cut off near the end of the trepanned work piece. This requires provision of extra stock, which is of little value when removed, in addition to the cutting operations after trepanning.

The principal objects of this invention are to overcome the aforementioned difficulties in chip removal and also to eliminate cutting off an end of the stock. Another object is to provide a delicate balance of the tubular tool carrier as it moves through the stock, whereby deviation and chattering of the tool are eliminated, assuring a straight hole concentric with the work piece and longer tool life.

In the accomplishment of these objects a hollow tool head is provided on the tubular carrier. The tool at the face or forward end of the head extends beyond the walls of the head both inwardly and outwardly but not as far as the axis. Thus, the annular space formed in the stock has its walls spaced respectively from the inner and outer walls of the head, forming an annular space between the core and the head and carrier and another annular space outwardly from the carrier to the bore wall.

A flow of oil is delivered to the outer space, and the head has longitudinal passages in its outer wall to deliver the oil to the forward end of the head. The head is also formed with internal passages to return the oil and chips to the annular space around the core and into the tubular carrier. The latter passage extends preferably from a point directly adjacent to the cutting edge of the tool so that the chips are washed away as soon as they are formed, with no opportunity to score the bore. According to Engineering Encyclopedia, The Industrial Press, 1941, page 1315, ample chip room is one of the important requirements in trepanning. The method and apparatus disclosed herein fulfil this requirement.

In order to cut through the entire length of stock, the core which is trepanned from the work piece is supported on centers at both ends. The work piece itself is supported at both ends in a conventional manner. The tool and carrier are of such internal diameter as to surround the centers. Thus, the head is adapted to pass over the center support at the far end of the stock and entirely through this end. As a result, no cutting off operation is required, and the severed core remains supported on the centers for an orderly removal of the core from the work piece.

The invention is fully disclosed by way of example in the following description and in the accompanying drawings in which:

Figure 1 is an elevation of a machine, partly in section, embodying the invention;

Figure 2 is a similar view of a modification;

Figure 3 is a detail section;

Figure 4 is an elevation of the tool head;

Figure 5 is another elevation thereof from a different angle;

Figure 6 is an end view thereof;

Figure 7 is a side elevation, partly in section, of a modified form of machine;

Figure 8 is a side elevation of a shaving tool installed in the machine of Figure 1 or Figure 2;

Figure 9 is a detail elevation of the shaving tool, partly in section, and

Figure 10 is an end view thereof.

Reference to these views will now be made, by use of like characters which are employed to designate corresponding parts throughout.

Figure 1 shows the general construction of a machine by which the invention is utilized. The machine comprises an elongated bed 1 having at one end a chuck 2 mounted in ball thrust bearings 3 in the usual manner. Between the ends of the bed is a tubular support post 3' on which is mounted a housing 4 which contains the rotating mechanism as will presently be shown in detail. The housing 4 carries a guide or holder 5 adapted to receive one end of a work piece 6, the other end of which is fixed in the chuck 2.

In this connection the chuck carries an axial screw 7 which extends into the adjacent end of the work piece at the axis, which is previously formed with a tapped hole 8 for this purpose. In the modification shown in Figure 2, the chuck 2 carries a center 9 which is inserted axially in the adjacent end of the work piece 6.

A guide or post 10 is fixed on the opposite end of the machine and supports one end of a rod 11 which is screwed axially at 12 in Figure 1 into the end of the work piece 6 at the guide 5. The outer end of the rod 11 is held in the post 10 by a nut 13, and the rod 11 obviously turns with the work piece. In Figure 2 the rod 11 has one end formed as a center 12' applied to the adjacent end of the work piece. In Figure 1 the rod 11 is under tension while in Figure 2 it is under compression.

The bed of the machine also carries a slidable post 14 in which is slidably mounted a tool-carrying tube 15. The tubing 15, hereinafter called the tool head tubular carrier, also passes slidably through the part 4 and carries at one end a hollow tool head 16 which engages the work piece around the connection 12 or 12' for a trepanning operation. Suitable means is provided for feeding the tubing 15 and the head 16 axially against the work piece 6 as the latter is rotated. Because of the center support 7 or 9 in the work piece in the chuck 2, the hollow head 16 passes entirely through the work piece and around the center support. The chuck 2 is relieved at 17 around the center support to accommodate the protruding end of the head 16. Several advantages result from this mode of operation. The trepanning operation does not leave the usual blind hole which requires cutting off and wasting an end of the work piece. Also, the core 18 is completely severed in the one operation and remains supported on the center supports 7 or 9 and the rod 11.

Coolant oil is fed into the bored hole 19 around the tubing 15 through a line 20 in the post 3'. By a system that will presently be described, the oil flows to the interior of the head 16 to wash the chips into a space that remains between the core 18 and the tubing 15, thus keeping the chips out of contact with the wall of the bored hole. The oil and chips are withdrawn through a suitable connection 21 sealed around the rod 11 at the rear end of the tubing 15.

Details of the hydraulic system are shown in Figure 3. The rotatable housing 4 is mounted on an extension 22 of the post 3' by means of suitable bearings 23 and 24. A suitable seal 25 is inserted in the opposite end of the member 3'.

The member 4 receives a collet attachment made up of a collet housing 26, a collet sleeve 27, and a collet adjusting nut 28 which supports the work piece at the starting end. An oil seal 29 seals the end of the work piece in the collet. The guide 5 has an inserted bushing 5' which acts as a guide for the initial travel of the tool head into the workpiece. After the tool head passes through the guide 5, 5', the bore functions as the guiding means for the tool head.

The tool head tubular carrier 15 passes slidably through the seal 25 and is spaced at 30 from the surrounding parts between the oil inlet 20 and the nearer end of the work piece 6. The tool extends radially beyond the tool head 16, thereby forming a space 19' between the tool head tubular carrier and the bored hole. The tool on the tool head is of such inward radial extent as to form another annular space 31 between the core 18 and the tool head tubular carrier 15. The tool head 16 has a longitudinal channel or passage 32 from the forward end to the space 31. Thus, the oil admitted at the inlet 20 flows to the spaces 30 and 19' and through channels around the outside of the tool head 16 to the forward end of the head and washes the chips through the passage 32 into the space 31 and to the rear lateral end of the tubing 15. As shown in Figure 6, the outer lateral wall of the head is continued at 32' across the passage 32, closing the passage at its outer side so that chips cannot be washed into contact with the wall of the bore, where they would do considerable damage. The oil and chips are discharged through the connection 21 of Figure 1 or into a suitable travelling pan 33 at the rear end of the tool carrier. Thus, the chips are washed out of contact with the wall of the bore. Further, the flow of oil both inside and outside the tubing 15 maintains the latter in hydraulic balance to avoid chattering of the cutter head and deviation or run-off from center. To insure such balance, the wall of the tubing 15 is formed with several apertures 34 connecting the oil spaces inside and outside the tubing.

An example of a cutter head is shown in Figures 4 to 6. The tool head 16 has a tapped skirt 40 into which the tubing 15 is screwed. A tool 41 is set in a seat 42 at the forward space of the head and extends radially to the internal cavity 43 of the tool head. The tool face is staggered at 44, and a circular tail piece 45 is formed on the rear end. The tail seats in a hole 46 and is held by a set screw 47. The main body of the tool is held by a lock screw 48.

The tool extends radially inward considerably short of the axis but beyond the inner wall of the tubing 15. Therefore, a core will be formed and will be spaced at 31 from the inner wall of the tubing, permitting the return flow of coolant oil and chips around the core as previously set forth. Adjacent to the forward edge or face of the cutter is the passage 32 for the flow of oil and chips to the cavity 43 and the space 31. The outer surface of the head is formed with a series of longitudinal channels 35 for delivering oil to the forward end of the tool head.

Opposite the tool 41, a block 49 is held in the head by screws 50 and carries an insert 51 of "Carboloy" or similar hard material that bears against the wall of the bore and serves as a guide. Between the tool and the block 49 is a similar block 52 carrying a member 53 similar to the insert 51. A diameter 54 can be drawn along the tool edge and through the center of the insert 51. The insert 52 is mounted off center with respect to the perpendicular diameter, thus bringing the trailing edge 55 of the insert 53 farther outward than the leading edge 56. This arrangement balances the cutting pressure at the tool 41 to avoid chattering and deviation of the tool head, which would cause eccentricity. For larger sizes of holes, more than one tool may be inserted in the tool head, and additional guides 51 may be provided as desired.

A modification for double end boring, or boring from both ends is shown in Figure 7. Centrally of the elongated bed 1 is mounted a motor 61 so constructed that a work piece 62 may be passed axially therethrough and secured centrally by chucks 63 rotated by the motor. On the bed are mounted two posts 64 adapted to be adjusted with respect to the work piece. Rotatable housings 65 carried by the post 64 are fitted with guides that receive the ends of the work piece as previously set forth.

Each assembly 64—65 slidably receives a tool head tubular carrier 67 fitted with a hollow tool head 68 such as that previously described. The heads are applied under pressure to the ends of the work piece 62 while the latter is rotated by the motor 61. The tool heads thus cut a core 69 from the work piece. Oil is supplied to the tubes 67 through lines 70 and is delivered into the forward ends of the heads to wash the chips rearward through the tubular carriers as previously described. The oil and chips are discharged into pans 71 suitably supported at the rear ends of the tubes.

When the tool heads are close to the center of the work piece, but have not yet met, one of them is withdrawn, and the hole is completed with the other tool head, thus forming a single core extending the entire length of the work piece. The ends of the core may be supported, if desired, as shown in Figure 1. Also, the work piece may be held fixed and the tool heads rotated if desired.

The operations of trepanning set forth above, although discussed as horizontal operations, may be adapted on a vertical machine with a corresponding normal rearrangement of bearings and power. The principles of the tool, tool head, tool head tubular carrier coolant flow, washing of chips back through tubular carrier remain unchanged.

The tool head is alined for the initial cut into the work piece in any of the described machines, by means of a conventional guide somewhat longer than the tool head.

The invention is suited particularly for deep hole work as in gun barrels and drill rods for wells. The long work pieces are usually supported additionally by well known steady rests (not shown). As a result of the described method and apparatus, the run-out or deviation of the tool is practically zero. Contrary to usual practice, the outside diameter of the stock can be turned before the hole is formed, whereas ordinarily the sequence is the reverse in order to make the outside diameter concentric with the hole.

In Figures 8 to 10 is shown a tool for shaving the hole after core drilling in the manner previously described. The tool comprises a body 72 having one end reduced and threaded at 73 to take a coupling 74. The latter is tapped at 75 to receive the forward end of the tool head tubular carrier 15'. The coupling has an axial hole 76 extending from the forward end to a point short of the rear end. Ports 77 extend rearwardly from the hole 76 to longitudinal passage 78 on the outer surface of the rear end of the coupling and thus to the oil supply path. The body 72 has a longitudinal passage 79 extending from the hole 76. Ports 80 extend forwardly from the passage 79 to a shoulder 81 which lies behind a neck 82 on the body.

Forward of the neck 82 is a head 83 formed on its outer surface with longitudinally extending flats 84. Blades or cutters 85 are mounted lengthwise in the head 83, extending also axially, and lie at the inward or blind edges of the flats.

The head is initially inserted in the chucking end of the work piece 6 and is worked rearwardly. The body 72 is preferably made of wood and functions as a pilot. The oil discharged from the ports 80 flows over the flats 84 and is discharged with the chips out of said chucking end of the hole.

The machine used for driving the shaving tool is similar to that shown in Figures 1, 2 and 3 except that the carrier 15' need not be perforated. In the instant case the carrier 15' is adequately balanced by the oil that surrounds it completely. In trepanning and boring, the oil pressure is about 275 pounds per square inch, and may be somewhat less for shaving.

Although specific embodiments of the invention have been illustrated and described, it will be understood that various alternations in the details of construction may be made without departing from the scope of the invention as indicated by the appended claims.

What I claim is:

1. A method of forming a hole in metal by means of a hollow internally and externally cutting core forming tool head threadedly mounted on a coaxial tubular carrier of smaller diameter than the hole to be formed, consisting in effecting a cutting movement of the head into the work piece to cut the core, supporting the core under tension from supports secured in its opposite ends, flowing oil around said carrier in a confined tubular path between the carrier and the wall of the hole being formed to a point forward of said head and thence rearwardly in a different path through the wall of the head into the space between the carrier and the core, whereby to wash the chips away from the wall of the bore and into the carrier, and also flowing oil under pressure directly from the first path through the wall of and into the carrier, for refined hydraulic balance of the head and carrier.

2. A method of forming a hole in metal by means of a hollow internally and externally cutting core forming tool head threadedly mounted on a coaxial tubular carrier of smaller diameter than the hole to be formed, consisting in effecting a cutting movement of the head into the work piece to cut the core, supporting the core under tension between core holders secured in opposite ends of the core, flowing oil around said carrier in a confined tubular path between the carrier and the surface of the hole being formed to a point forward of said head and thence rearwardly in a different path through the wall of the head into the space between the carrier and the core, whereby to wash the chips away from the wall of the bore and into the carrier, and also flowing oil directly from the first path in a rearward direction through the wall of and into the carrier, for refined hydraulic balance of the head and carrier.

3. A method of forming a hole in metal by means of a hollow core-forming tool head threadedly mounted on a carrier consisting in effecting relative rotation between said head and a work piece while effecting a cutting movement of the head into the work piece, flowing oil in a tubular path around and in contact with the outer surface of said carrier to the forward end of said head then radially inwardly in the area of a cutting edge of the tool and rearwardly through the space around the core, whereby to wash the chips away from the wall of the bore and into the carrier, the core being supported in tension between core holders secured in opposite ends thereof.

4. A method of forming a hole in metal by means of a hollow core-forming tool head having a cutter carrier threadedly mounted thereon consisting in effecting relative rotation between said head and a work piece while effecting a cutting movement of the head into the work piece, flowing oil in a tubular path around and in contact with the outer surface of said carrier to the forward end of said head then radially inwardly in the area of the cutting edge of the tool and rearwardly through the wall of the head into a space around the core whereby to wash the chips away from the wall of the bore and into the carrier, and also flowing oil directly through the wall of and into the carrier for refined hydraulic balance of the head and carrier the core being secured in tension between core holders secured in opposite ends thereof.

5. A method of forming a hole in elongated metal stock by means of a hollow tool head threadedly mounted on a carrier consisting in supporting opposite ends of a work piece simultaneously by center supports, exerting tension on the center supports to maintain the work piece under tension, applying said head and carrier to said work piece in concentric and surrounding relation to the support at one end, effecting relative rotation between said head and work piece, and effecting a cutting movement of the head into the work piece until the head surrounds the support at the other end and passes through said other end of the work piece, whereby the core extends fully from end to end of the work piece and remains supported in tension between the center supports.

6. The method of core drilling consisting in supporting the work piece simultaneously at both ends by means of center supports at said ends, exerting tension on the center members to maintain the work piece under tension, feeding a tool into one end of the piece in surrounding relation to the center member at that end, and continuing the feeding of the tool until it surrounds the center member at the other end and emerges through said other end.

References Cited in the file of this patent

UNITED STATES PATENTS

| 47,572 | Rogers | May 2, 1865 |
| 92,395 | Strong | July 6, 1869 |
| 665,158 | Abrams | Jan. 1, 1901 |
| 1,281,420 | Reid | Oct. 15, 1918 |
| 1,322,399 | Baumann et al. | Nov. 18, 1919 |
| 2,240,795 | Morgan et al. | May 6, 1941 |

FOREIGN PATENTS

| 621,684 | Germany | Nov. 12, 1935 |

OTHER REFERENCES

Gun Boring, B. I. O. S. Report No. 888, item No. 2.

Magazine "Machinery," pages 701, 702, November 18, 1948.